Patented Nov. 23, 1948

2,454,394

UNITED STATES PATENT OFFICE 2,454,394

LUBRICATING OIL COMPOSITION

Eugene Lieber, New York, N. Y., and Edward P. Cashman, Bayonne, N. J., assignors to Standard Oil Development Company, a corporation of Delaware No Drawing. Application September 7, 1945, Serial No. 615,081

2 Claims. (Cl. 252—50)

This invention relates to the preparation of novel chemical products and to uses thereof, and more particularly, it relates to the preparation of novel additives for lubricating oil, for serving as pour depressors and as promotion inhibitors.

Pour depressors for waxy mineral lubricating oils have for some time heretofore been made commercially by chemical condensation of aromatic compounds such as naphthalene or phenol with high molecular weight aliphatic materials such as chlorinated paraffin wax or olefins corresponding thereto. One object of the present invention is to make improved products analogous to those in certain respects, e. g. pour-depressing properties, but having the unexpected additional property of being corrosion inhibitors. Another object of the invention is to make pour depressors from a class of materials not heretofore ever used for such purpose.

Broadly, the present invention comprises chemically condensing an aromatic compound with an aliphatic nitrile. The reaction is preferably carried out in the presence of a Friedel-Craft catalyst.

The aromatic compound to be used should be one containing at least one reactive nuclear hydrogen atom, and is preferably selected from the class consisting of aromatic hydrocarbons and hydroxy and amino derivatives thereof. Suitable examples of such compounds include naphthalene, anthracene, phenanthrene, benzene, toluene, xylene, amyl-benzene, phenol, cresol, naphthol, amyl-phenol, aniline, xylidine, etc. as well as mixtures thereof or crude commercial products consisting essentially of such compounds, e. g. coal tar aromatics, including hydrocarbons, phenols, etc., mixed aromatic hydrocarbon fractions obtained from petroleum by various means such as cracking, solvent extraction, etc., mixed petroleum phenols which have a composition averaging about that of a butyl-phenol, etc.

The aliphatic nitrile to be used may be any having the general formula $R(CN)_n$, where R is a hydrocarbon group containing at least two, and preferably at least ten, aliphatic carbon atoms, and selected from the class consisting of alkyl, alkenyl, alkylene, aralkyl, cycloalkyl and similar hydrocarbon groups, and $n$ is a number indicating how many —CN groups are attached to the R group, if the product is a pure compound, or $n$ may be a fractional number indicating the average number of —CN groups in a mixed aliphatic nitrile product. Preferred aliphatic nitriles to be used according to this invention include stearonitrile, palmitonitrile, oleonitrile, lauronitrile, myristonitrile, margaronitrile and the nitriles of mixed fatty acids such as those derived from various natural fats and oils, e. g. beef fat, mutton fat, cocoanut oil, cottonseed oil, etc. An even lower number of carbon atoms may also be used such as capronitrile, valeronitrile, butyronitrile, etc. Some of the substituted aliphatic nitriles which may be used include phenyl-stearonitrile, and nitriles of polybasic acids, e. g. azelayl nitrile, and acids derived from petroleum sources, e. g. naphthenic acids, paraffin wax acids prepared by oxidation of paraffin wax, etc.

In carrying out the reaction, it is preferable to use an inert solvent such as a refined petroleum hydrocarbon fraction such as kerosene, heavy naphtha, etc., or a highly chlorinated lower hydrocarbon such as tetrachlorethane, dichlorbenzene, etc. If such solvent is used, ordinarily it is best to use about ½ to 10, preferably about 1 to 5, volumes of solvent per volume of mixed reactants.

The proportions in which the reactants per se should be used may vary to some extent according to the nature of the materials used, but will normally range from about ½ to 5, preferably about 1 to 3, mols of the nitrile per mol of aromatic compound. The reaction is preferably carried out in the presence of a condensation catalyst of the Friedel-Crafts type, and an anhydrous aluminum chloride is the preferred material, although other Friedel-Crafts catalysts may be used such as boron fluoride, tin tetrachloride, titanium tetrachloride, etc.

The temperature at which the condensation is carried out may range normally from about room temperature up to about 300° F., the preferred procedure being to slowly add the catalyst to a reaction mixture consisting of the two reactants together with inert solvent if the latter is used, starting with room temperature and after the reaction has subsided gradually heating the mixture to the desired final temperature for a sufficient reaction time between the approximate limits of about 1 to 5 hours, preferably about 2 to 3 hours. The actual time will of course depend on the reaction temperature. As little or no gas is given off during the reaction, the best way to judge when the reaction has been completed is the general viscosity of the reaction mixture which becomes thicker as the reaction proceeds.

After reaction has been completed, the desired high molecular weight condensation product may be recovered in any suitable manner, but the preferred procedure is to cool the reaction mixture, dilute it with about ½ to 5 volumes of inert solvent, preferably the same as used during the reaction (if any was used), and then the catalyst is neutralized by adding a suitable hydrolyzing agent such as water, alcohol, aqueous caustic soda, aqueous hydrochloric acid, etc. or mixtures thereof. The resultant catalyst sludge is then settled and removed, and the solvent extract containing dissolved condensation products is then submitted to distillation under reduced pressure, such as by fire and steam up to 500° F. or 600° F., to remove solvent, unreacted raw materials, and any low-boiling condensation products, and to recover as distillation bottoms the desired high molecular weight condensation product which is generally a dark-viscous oil or solid.

This condensation product is soluble in waxy mineral lubricating oils, and normally should have an average molecular weight above about 600, and preferably about 1,000 to 5,000. It has been found to be valuable as a polyfunctional lubricating oil additive, since it not only has pour-depressing properties, but also has corrosion inhibiting properties, which are particularly useful in conjunction with a lubricant containing an extreme pressure lubricating agent such as one made by chlorinating a petroleum hydrocarbon fraction, e. g. kerosene or paraffin wax and sulfurizing the resultant chlorinated hydrocarbon with sodium polysulfide, sodium xanthate, or other sulfurizing agents known to the art. When this product is used as a pour depressor in waxy mineral lubricating oils, it may be used in a concentration ranging from about 0.1% to 5% or more, and it should be noted that with this particular pour depressor larger concentrations such as 5% generally give substantially better results than lower concentrations such as 1% and 2%, while this is not true of a number of other pour depressors. When used essentially as a corrosion inhibitor, the desired concentration will vary essentially with the amount and corrosiveness of the extreme pressure lubricating agent or other corrosive constituents of the composition in question, but normally a concentration of 0.1% to 2% or so is sufficient for corrosion preventing purposes. The condensation products of this invention may also be added to various other materials, e. g. Diesel fuel, kerosene, domestic heating oils, petroleum naphthas, or normally solid petroleum fractions such as paraffin wax, petrolatum, etc., as well as other corrosive or wax-containing products such as those containing a major proportion of resins, gums, rubber, synthetic rubbers, or other plastics, etc.

Although the mechanism of the operation of the invention is not well understood, it is believed that since substantially all of the nitrogen present in the aliphatic nitrile raw material is found in the final product, that the chemical reactions involved may first proceed with a condensation of a nitrile molecule on to the nucleus of the aromatic compound, with the resultant formation of an aromatic-aliphatic imine, or the CN group may split off from the nitrile and add directly on to the aromatic nucleus, and also the aliphatic portion of the nitrile may combine with the aromatic nucleus, and then one or more of the resulting products may combine with themselves by auto-condensation or some other polymeric condensation process to build up molecules having an average molecular weight above about 600 and generally above 1,000, which are substantially non-volatile up to at least 500° F. or 600° F. under fire and steam distillation, or up to at least 400° F. under a vacuum corresponding to an absolute pressure of about 10 mm. mercury.

Another possible reaction is the combining of two or more of the fatty acid nitrile molecules through intermediate formation of the imine hydrochloride and subsequent splitting off of HCl, to produce fatty acid imine polymers of the dimer, trimer, and higher stages, and these in turn may combine with some of the other products mentioned hereinabove. A still further possibility is that some products may combine by the splitting out of ammonia, although this does not appear so likely, in view of the relatively high content of nitrogen in the final product.

The objects, advantages and details of the invention will be better understood from a consideration of the following experimental data.

*Example 1*

200 grams of fatty nitrile derived from mixed fatty acids (having an average composition of about $C_{17}$ to $C_{18}$) and 100 grams of naphthalene were dissolved in tetrachlorethane as solvent. Then the mixture was heated to 180° F. and 30 grams of aluminum chloride added slowly over a thirty minute period keeping the temperature at about 200° F. After the addition of the aluminum chloride the reaction temperature was raised to 250° F. and maintained thereat for 2½ hours. At the end of this time the reaction mixture was cooled, diluted with a further quantity of tetrachlorethane and the aluminum chloride neutralized. After settling and removing the aqueous layer the tetrachlorethane solution of the reaction product was distilled by fire and steam to 600° F. to recover the solvent and low boiling products. A bottoms residue comprising 112 grams of a brown viscous oil was obtained as reaction product. An analysis of this material showed it to contain 4.3% nitrogen.

When 5% of this product was blended in a waxy lubricating oil having an initial pour point of +30° F., the pour point was found to be —10° F. These products are effective anti-corrosion materials for lubricating oil systems containing corrosive agents, for example, extreme pressure lubricants. This was tested by adding 1% of the condensation product as prepared as described above in a blend comprising 10% of an E. P. agent made by treating chlorinated kerosene with sodium polysulfide, and 90% of a lubricating oil. This was used as the lubricant in an S. A. E. load bearing machine giving the test piece a thirty second break-in with a twenty pound scale load and subsequently increasing to fifty pounds for five minutes. The test pieces were removed, placed in beakers and set in a closed container over a saturated solution of sodium carbonate for 24 hours. Visual examination of the test pieces for corrosion showed that about 8% of the area was corroded with rust. A control test of the same lubricating oil composition without this condensation product showed a rusted area of about 70%.

*Example 2*

Using the procedure described in Example 1 the following proportion of reagents were submitted to reaction:

Fatty nitriles _____ grams__ 200
Naphthalene _____ do____ 50

Aluminum chloride _____ grams__ 30
Tetrachlorethane as solvent _____ cc__ 200

The product was recovered as described in Example 1, and 113 grams of a brown viscous oil was obtained as product.

The pour depressant potency of this condensation product was tested by blending in a waxy oil having an initial pour point of +30° F. The following results were obtained:

|  | Pour point, °F. |
|---|---|
| Original oil | +30 |
| Original oil +2.5% condensation product | −5 |
| Original oil +5.0% condensation product | −15 |

*Example 3*

Using the procedure of Example 1 the following proportion of reagents were submitted to reaction:

Fatty nitriles _____ grams__ 200
Phenol _____ do____ 100
Aluminum chloride _____ do____ 30
Tetrachlorethane as solvent _____ cc__ 200

The product was recovered as before and 123 grams of a brown viscous oil was obtained as product. When 5% of this material was blended in a waxy oil having an initial pour point of +30° F. the pour point was found to be −15° F.

It is not intended that this invention be limited to the specific examples which have been given merely for the sake of illustration, but only by the appended claims in which it is intended to claim all novelty inherent in the invention.

What is claimed is:

1. A lubricating oil composition comprising a major proportion of waxy mineral lubricating oil containing dissolved therein a minor but pour depressing amount of about 0.1 to 5% of a condensation product having an average molecular weight above about 1000 and derived by condensation of about 200 parts by weight of aliphatic nitriles of mixed fatty acids having about 16 to 18 carbon atoms, with about 50 to 100 parts by weight of naphthalene, in the presence of about 30 parts by weight of aluminum chloride and in the presence of about ½ to 10 volumes of inert chlorinated hydrocarbon solvent per volume of mixed reactants, at a reaction temperature of about 250° F. for about 2 to 3 hours, followed by hydrolysis and removal of the catalyst and distillation of the reaction products under reduced pressure up to about 600° F. to obtain the desired condensation product as distillation residue.

2. A lubricating oil composition comprising a major proportion of a waxy mineral lubricating oil containing dissolved therein a minor but pour depressing amount of about 0.1 to 5% of a condensation product having an average molecular weight of about 1000 and derived by condensation of about 200 parts by weight of stearyl nitrile with about 50 to 100 parts by weight of naphthalene in the presence of about 30 parts by weight of aluminum chloride and in the presence of about ½ to 10 volumes of inert chlorinated hydrocarbon solvent per volume of mixed reactants, at a reaction temperature of about 350° F. for about 2 to 3 hours, followed by hydrolysis and removal of the catalyst and distillation of the reaction products under reduced pressure up to about 600° F. to obtain the desired condensation product as distillation residue.

EUGENE LIEBER.
EDWARD P. CASHMAN.

REFERENCES CITED

The following references are of record in the file of this patent:

UNITED STATES PATENTS

| Number | Name | Date |
|---|---|---|
| 2,125,851 | Ralston | Aug. 2, 1938 |
| 2,162,971 | Ralston | June 20, 1939 |
| 2,175,092 | Ralston | Oct. 3, 1939 |
| 2,185,237 | Weiljard | Jan. 2, 1940 |
| 2,231,148 | Bartlett | Feb. 11, 1941 |
| 2,280,058 | Bruson | Apr. 21, 1942 |
| 2,353,053 | Lieber | July 4, 1944 |

OTHER REFERENCES

Groggins, "Unit Processes in Organic Synthesis" (1935), page 586.